United States Patent [19]

Mugrauer et al.

[11] Patent Number: 4,764,776
[45] Date of Patent: Aug. 16, 1988

[54] THERMO TRANSFER PRINTER

[75] Inventors: Hubert Mugrauer, Poering; Guenther Haass, Munich, both of Fed. Rep. of Germany

[73] Assignee: Siemens Aktiengesellschaft, Berlin and Munich, Fed. Rep. of Germany

[21] Appl. No.: 71,973

[22] Filed: Jul. 10, 1987

[30] Foreign Application Priority Data

Jul. 11, 1986 [DE] Fed. Rep. of Germany ....... 3623450

[51] Int. Cl.$^4$ .......................... G01D 15/10; B41J 3/20; B41J 3/10
[52] U.S. Cl. .................... 346/76 R; 400/120; 400/121; 346/76 PH; 346/76 L; 346/108; 346/151
[58] Field of Search ................ 400/118–121; 350/334, 350 R, 356; 355/1; 346/107 R, 108, 76 R, 76 PH, 76 L, 151, 160

[56] References Cited

U.S. PATENT DOCUMENTS

| 4,392,141 | 7/1983 | Inoue | 346/76 RX |
| 4,480,257 | 10/1984 | Hill | 346/107 R |
| 4,491,432 | 1/1985 | Aviram | 400/118 X |
| 4,525,722 | 6/1985 | Sachdev | 346/76 LX |
| 4,591,886 | 5/1986 | Umeda | 346/160 |
| 4,596,993 | 6/1986 | Erlichman | 346/76 LX |
| 4,614,954 | 9/1986 | Ohta | 346/107 RX |
| 4,675,699 | 6/1987 | Kan | 346/76 R |

Primary Examiner—Paul T. Sewell
Attorney, Agent, or Firm—Hill, Van Santen, Steadman & Simpson

[57] ABSTRACT

A print head for a printer is constructed as an optical character generator and comprises a plurality of switch cells arranged in a two-dimensional field. The energy output by radiation source is transmitted in parallel onto the matrix dots arranged in a grid and these matrix dots lie in the plane of an ink layer on a band-shaped continuous carrier. Each of the switch cells comprises an optical switch element composed of a transparent ferroelectric ceramic substrate composed of lead, zirconate titanate doped with lanthanum and having transparent electrodes for applying a pulse-shaped controlled voltage. In response to a corresponding control voltage, the radiant energy is transmitted frm the switch element into the allocated matrix dot, for example, for a local melting of the ink layer on the carrier, which was coated with a thermo plastic printing ink having a low melting point. The printing arrangement is suitable for line printers having single colors or multiple color printing.

14 Claims, 3 Drawing Sheets

THERMO TRANSFER PRINTER

BACKGROUND OF THE INVENTION

The present invention is directed to a thermo transfer printer which has a print head having a plurality of switch cells or elements arranged in a two-dimensional field and controlled by the information to be printed. Energy output from an energy source is transmitted parallel through the switch cells onto the matrix dots, which are arranged in a grid, and these matrix dots lie in the plane of a dye or ink layer on a surface of a band-shaped dye or ink carrier so that portions of the dye or ink will absorb the local energy to a degree to become melted or liquid and be transferred under pressure to the print medium, which is held in contact therewith.

In modern printers, which are preferably utilized as periphery apparatus of data processing systems, non-mechanical printing principles are being utilized to an increasing degree. These principles include printers, which operate on the electrophotographic principle and which have prevailed to a considerable degree. This printing principle is relatively complicated and, thus, costly. This is to be attributed to the fact that an electrostatic image of a print pattern must be generated on a charge drum in order to be able to produce a distribution of the toner particles corresponding to the charge image. Then these toner particles are transferred onto the printed medium, preferably paper, in a single-sheet format or, respectively, continuous form format and are then fixed or secured thereto. Therefore, due to the relatively great technical outlay involved with these devices, there have been many attempts to introduce other non-mechanical printing principles.

One of the other known, even though hereto less successful, non-mechanical printer principles is the principle of thermo transfer printing. In accordance with this principle, a corresponding quantity of energy on the basis of which the production of a matrix dot is initiated, is to be brought locally, for example, micropoints close to or, respectively, on the surface of a print carrier. This can occur, for example, in that special papers are employed which discolor given the incidence of radient energy. An intial disadvantage of this type of printing is the required use of the special papers. Another disadvantage is that the chromatic appearance of the print is restricted. Over and above this, the print quality, for example, the sharpness of the printing produced, also leaves something to be desired given the known thermo transfer printing devices that work with such special papers.

If one wishes to realize the principle of thermo transfer printing without special papers, dyestuff or pigment particles must be transferred in the desired pattern onto the print medium, with the pattern being triggered by locally applied energy. Known solutions for this embodiment of the thermo transfer printing principle cannot satisfy fully, because they are not fully satisfactory in view of the print performance and/or in the print quality as well. Therefore, they cannot compete in competition with known printers, which utilize an electrophotographic principle. Among the reasons for this is that it is difficult to make an adequately high amount of energy for fixing the dyestuff or pigment particles in the matrix dot of a printed pattern available and to also modulate this energy transfer with a corresponding high frequency, which is the prerequisite for a high print performance, but also print quality.

It has become clear, therefore, that two significant problem areas are present in thermo transfer printing. One of these areas is that the ink per se and the way in which the ink is transferred onto the print medium, for this determines the quantity of the energy required. The other problem is the printer head, which is a device with which a momentarily energized image of the desired print pattern is generated close to or at the surface of the print medium. Known printer heads, for example, utilizing heated writing electrodes are in contact with the print medium. They have a problem with a resistance to wear and the thermal inertia of the print element is also a problem. The overall energy required in conventional solutions based on the thermo transfer principle are also high. Known solutions for the utilization of the thermo transfer principle, which have been known for a long time per se have, therefore, always still been unsatisfactory up to now and not adequately competitive in the face of other non-mechanical printing principles so that such a solution has not prevailed.

SUMMARY OF THE INVENTION

It is, therefore, an object of the invention to create a thermo transfer printing means or arrangement which has an optimally low energy requirement with high printer performances and with good print quality and, thus, economically, enables the use of thermo transfer printing principles.

These objects are obtained in an improvement in a thermo transfer printer having a printing head having a plurality of switch cells arranged in a two-dimensional field and controlled by printing information, an energy output by an energy source being transmitted through the switch cells onto matrix dots arranged in a grid which lie in the plane of the pigment layer of a band-shaped carrier so that locally heated portions of the pigment layer will be transferred onto a print medium which is held thereagainst under pressure. The improvements are that the pigment carrier is coated with a thermo plastic ink and is constructed to be a moving endless band, which passes through a heated ink applying means for regenerating the layer of pigment on the carrier, the printing head is combined with a high energy radiation source and is constructed as an optical character generator in which every switch cell comprises an optical switch element composed of a transparent ferro-electric ceramic substrate of a lead zirconate titanate doped with lanthanum and has a pair of transparent electrode pairs for applying a pulseshaped control voltage, a first optical element and a second optical element for each switch cell, said first optical element being arranged to lie in the beam path preceeding the optical switch cell to direct the energy as a parallel expanded beam into the cell and the second optical element is arranged in the beam path following the switch element and at a predetermined distance from the carrier so that it will focus a portion of the beam onto the matrix dot.

The solution of the invention utilizes, first, the fact that an offset printing technology has created a dyestuff or pigment type, whose special properties allow its employment to appear suitably precisely as a dyestuff for the present case and allows its use in a different way than it is conventionally applied. The dyestuff is a thermo plastic ink, which is also known as a cold set or, respectively, a hot-carbon ink in the printing technology. These dyestuffs or inks are of such interest for the conventional application, since they are included in the fast-drying inks. They are composed of waxes and wax-like products in which colored pigments are finely dispersed in the liquid condition when they are being manufactured. The best known application of these inks are probably sets of NCR forms, wherein the ink has replaced the previously utilized carbon paper.

The fast drying of these inks is, in fact, likewise, advantageous for the present application for it enables a circulating carrier to be provided and this is constantly and completely regenerated by renewing ink coating continuously and simultaneously with the printing operation. The possibility of regenerating the carrier eliminates one of the greatest deficiencies of the conventional thermo transfer printers, namely the high pigment costs, which were heretofore accepted in them. Practically no pigment loss occurs in the process or solution of the present invention.

What is of even greater significance, however, is the fact that these inks can be melted with a considerably lower energy outlay in comparison to other pigments so that they can be transferred onto the print medium. The low energy consumption for the conversion from a solid into a liquid or melted condition for the inks, however, is what makes it possible to employ a character generator as a printing head. This character generator transports the required radiant energy onto the boundary layer between the carrier and the print medium in a non-contacting, purely optical fashion. One of the most significant disadvantages of known thermo transfer printing units is, thus, eliminated, namely the high wear of the printer head.

Under these conditions, it is possible, first, to employ commercially available radiation sources having a relatively high power and an extremely compact structure, for example, a Xenon short-arc light. One must thereby remember that such a printer must have a corresponding print performance given high print quality in order to be competitive with printers already introduced on the market. What this practically means is that the matrix dot grid of up to several thousand matrix dots must be simultaneously generated with the character generator and the transferring energy must be adequate in order, even in the extreme cases, to be able to locally melt the dye or ink layer in all of these matrix dots.

Despite the low melting point of the thermoplastic inks, which is in a range of 60° to 130° C., this relatively high energy current having a high frequency must be switched on and off, respectively, in such an optical character generator with short switching times.

This is possible in the solution of the present invention by switch cells of the optical character generator in which an optical switch element is employed. This optical switch element has been originally developed for the application of opto-electronics, but also is capable of being advantageously utilized in the application existing in the present invention. Ferro-electric ceramic are employed, and are known particularly as PLZT elements in opto-electronics. It is an advantage that it can be switched practically without storage effect. By applying an external, electrical field, the switch cell changes its transmission properties, both in view of rotation of the polarized plane, as well as in view of the scattering of the transmitted radiation.

The improvements of the present invention can be exploited so that different embodiments are possible and are available utilizing the optical switch element. This allows a flexible adaptation to specific applications.

This is promoted by the fact that, as a result of progress in the field of opto-electronics, other, modern optical elements which can also be advantageously utilized in the present application are also currently available. Thus, for example, gradient fibers, which have been developed for jobs in the field of light transmission, are capable of being utilized as collimator lenses or as imaging optics as well. As improvements of the invention set forth in the various embodiments, gradient fibers can be advantageously used in the present case to spread the ray beam to be switched with the assistance of the above-mentioned optical switch element or cell so that the radiant density within the switch cell is lowered and the switching problems become less critical. Added thereto is the fact that an enlarged diameter of the ray beam, which is passing through the switch cell also has a beneficial effect in view of the tolerances, since absolute position deviations of the individual elements of the switch cell relative to one another, for example, of the gradient fiber and of the optical switch element, have less of an influence on the transmission losses.

Overall, thus, the technical teachings of the invention enable a printer unit based on the thermo transfer printing principle to be constructed which supplies print results with a relatively low quantity of energy, which results are definitely comparable to those of other printing principles. The utilization of modern optical elements with respect both to the radiation source as well as to the actual elements of the character generator enable a compact structure with a non-contacting "printer head" whose functional structure is simple, wear-resistant and cost-beneficial with respect to the individual channel upon employment of commercially available products.

Given the compactness of such a printer unit, it is not only monochromatic solutions which are possible. Experiences in view of high-quality multi-color printers already acquired in order non-mechanical printing principles can also be utilized here, for it is possible without further ado in structural terms to serially connect a plurality of monochromatic printer units following one another and, thus, to create multi-color printing means.

Other developments of the invention as well as details relating to the embodiments and their advantages may be readily apparent from the following descriptions of the exemplary embodiments, the drawings and claims.

DESCRIPTION OF THE PREFERRED EMBODIMENTS

Figure 1:
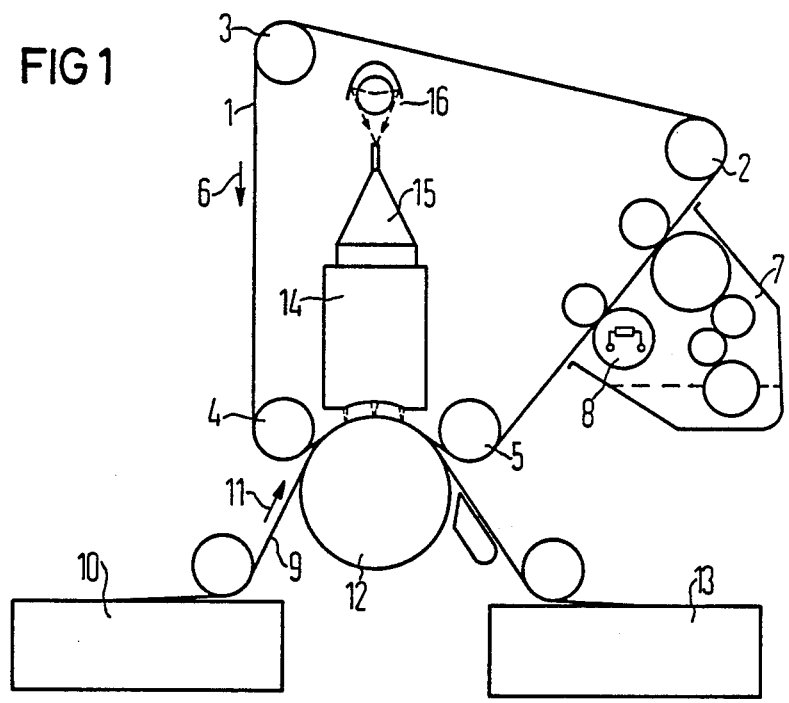
FIG. 1 is a schematic illustration of a print unit of a radiation thermo transfer printer comprising an optical character generator in accordance with the present invention.

The principals of the present invention are particularly useful in a printer unit illustrated in FIG. 1. In the printer unit of FIG. 1, an endless band-shaped carrier 1 is transported in a circular path over rollers 2–5 in the direction of the arrow 6. During circulation, the carrier 1 is drawn through an inking means or apparatus 7 so that a thin film of only 2–5 μm thick of a thermoplastic ink is applied to the band-shaped carrier 1 in the inking apparatus. As in letterpress or, respectively, offset printing technologies, the ink supplied here in a thermo transfer printer are known as what are referred to as cold set inks or hot carbon inks. They are included in the fastdrying inks and are composed of waxes or waxlike products in which color pigments and soots are dispersed in a superfine form in their fluid condition. Such ink compounds will solidify at room temperature. The inking apparatus known for processing such inks are, therefore, heated in order to liquify the inks. Given the ink type under discussion here, a heating of the inking apparatus to about 100° C. is adequate.

Although the thermo plastic ink, given such inking apparatus, is usually directly applied to the carrier medium, preferably paper, it also can be applied to plastic films. The structural principles of known inking apparatus can also be utilized for the present application. In summarizing a description of the procedure for applying ink, it is indicated that the carrier 1 enters into the inking apparatus 7 and first has its layer side pressed against a heated hot roller 8, whose thermal capacity is adequate in order to fuse any remaining ink or pigment layer which is remaining on the carrier 1. The inking layer is subsequently reapplied to the tape-shaped carrier 1 via a plurality of rollers and squegees.

After leaving the inking apparatus 7, the newly coated carrier 1 proceeds over the circulating rollers 2 and 3 into the actual transfer station. The ink will cool while being transferred along this path to a temperature below a solidification point and, thus, has no tendency to moisten a medium to be printed, given mere contact with this medium.

As illustrated, the medium to be printed is a print medium 9, which is normally paper in the form of single sheets or a paper web. It is schematically indicated in FIG. 1 that the print medium 9 is taken from an input station 10 and is introduced in the direction of arrow 11 onto a transfer station of the thermo transfer printer. Among other things, this transfer station contains a pressure roller 12, which is combined with the circulating rollers 4 and 5 for the band-shaped carrier 1 to provide a direct contact of the coated side of the band 1 to the print medium 9 in the region of the transfer station. Finally, after the print medium 9 has passed over the roller 12, it is received in a deposit station 13, which is arranged in the output side of the transfer station in order to accept the printed print medium. The modules of the print unit, which have been set forth up to now, correspond to conventional equipment and printers, and even if they are not necessarily known in combination with thermo transfer printers units. A more detailed description of these modules, therefore, does not seem necessary in view of the fact that each of the modules is an existing unit.

Above the transfer station is a character generator 14, which is arranged above the pressure roller 12, as illustrated in FIG. 1. The character generator 14 receives radiant energy through a glass fiber bundle 15 from a radiation source 16 which has an integral reflector. The radiation source is preferably a commercially available Xenon short-arc lamp, for example, a lamp manufactured by ILC Technology and sold under the Trademark CERMAX.

The character generator 14 itself is composed of a two-dimensional field of switch cells or elements which will allow energy to be focused point-by-point through the transparent carrier 1 onto the print medium 9 and to thus locally melt the ink layer applied to the carrier 1 at these focal points. In this melted condition, the ink is transferred onto the print medium 9 and, dependent on the surface of the print medium, diffuses therein to a greater or lesser degree. The transfer process thus has been ended and the repeating process begins anew with the replenishing of the ink layer on the carrier 1 in the inking device or apparatus 7.

Figure 2:
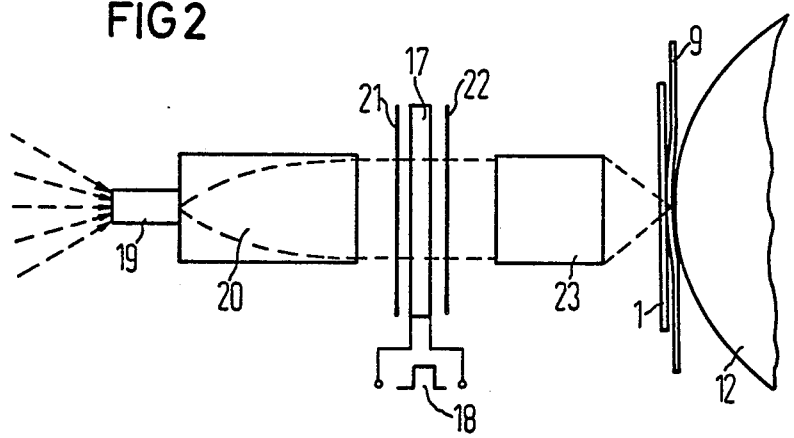
FIG. 2 is an enlarged schematic illustration of an embodiment of a switch cell for a character generator in accordance with the present invention.
Figure 3:
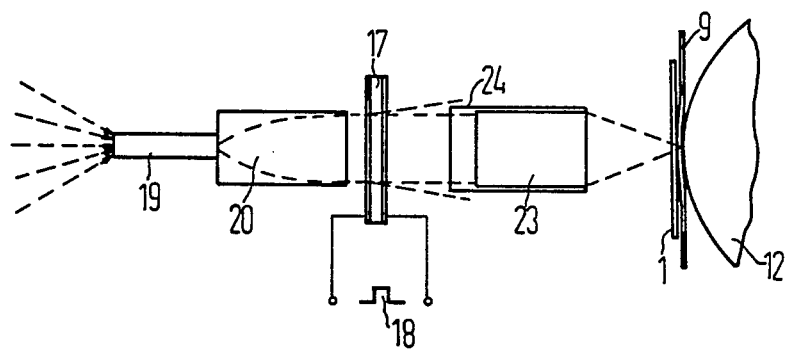
FIG. 3 is an enlarged schematic illustration of a second embodiment of a switch cell for a character generator in accordance with the present invention.
Figure 4:
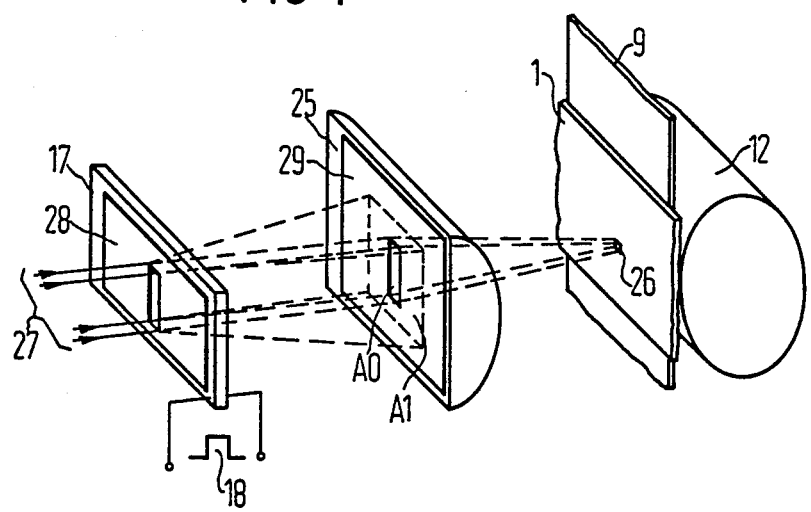
FIG. 4 is an enlarged perspective view of a third embodiment of a switch cell for a character generator in accordance with the present invention.

Individual elements, for example individual switch cells or elements, which form the generator 14, are shown in various embodiments in FIGS. 2–4. What all these embodiments have in common is that they comprise an optical switch element 17, which is known per se from opto-electronics. The switch element is a transparent, ferro-electric ceramic lamini that is composed of lanthanum-doped lead, zirconate titanate (Pb,Ld)(Zr,Ti)$O_3$, and is also referred to as a PLZT element in optoelectronics. For the applications of switch elements, this ceramic lamina is coated with transparent surface electrodes on both sides so that a pulse-shaped voltage can be applied to these electrodes, as schematically illustrated by a pulse 18 in FIG. 2.

Of crucial significance for this transfer method in addition to the type of thermo plastic ink employed is a suitable character generator which can simultaneously melt more than 1000 points without contacting the carrier 1. Thus, the generator is adequately energized and nonetheless has short switching times.

Among other things, the optical switch element 17 rotates the polarization plane of the incident light rays and this effect is utilized in the embodiment of the switch cell or element, as shown in FIG. 2. With the assistance of the radiation source 16, which is already set forth with reference to FIG. 1, the energy required for melting the dyestuff or ink is coupled into the switch element in an optical fiber 19 having a diameter of in a range of about 75–300 μm. This radiation is converted into a parallel beam having an enlarged beam diameter by a first gradient fiber 20 having a diameter of about 1–2 mm. As illustrated, a polarizer 21 is placed in the beam path before the optical switch element 17 and an analyzer 22 is placed after the switch element 17. A second gradient lens 23 follows the analyzer 22 in the path of the beam through the element 17 and the length of the second lens 23 is matched so that the beam incident parallel on the lens 23 is focused at a prescribed distance from the image side end face of the fiber lens. This distance, for example, amounts to 3 mm and defines a focal plane in which both the band-shaped carrier 1 and the ink layer that is to be melted lie.

Gradient fibers are known and are sold under the Trademark "SELFOC" and are used for microlenses for micro-optical applications. In the present case, the first gradient fiber 20 enables the conversion of the focused light beam supplied by the optical fiber 19 into a parallel beam having an enlarged beam diameter. This reduces the flux density passing through the polarizer 1 and the optical switch element 17 and the analyzer 22 in relationship to the cross sectional surface of the optical fiber 19 relative to the first gradient fiber 20. The spreading of the beam also has the advantage that, given the same absolute tolerances, positional deviations of the central axis of the two gradient fibers 20 or 23, respectively, relative to one another, have a less pronounce effect when considered absolutely, since the radiation can be coupled into the second fiber 23 with less losses.

The functioning of this switch cell is based upon the fact that the polarizer 21 determines a predetermined polarization plane of the radiation entering into the optical switch element 17. When an electrical voltage is applied to this element, then this causes a rotation of the polarization plane of the emerging beam. Given suitable dimensioning of the voltage amplitude and a position of the polarization plane of the analyzer 22 selected relative thereto in view of that of the polarizer 21, the radiant energy emerging from the analyzer 22 can, thus, be controlled. An optical switch element 17 composed of the above-described ferro-electric ceramic has the advantage that it operates nearly free of inertia, without a storage effect. It is, therefore, suitable for a pulsed mode with a correspondingly high pulse frequency. In the described arrangement, the critical advantage of the switch cell of FIG. 2 is the relatively low radiant density to which the polarizer 21, the switch 17 and the analyzer 22 are exposed. In addition, extremely good contrast, which is defined as the ratio of the output radiant energy in the engaged or, respectively, in the disengaged condition of more than 100 can be achieved given a transmission factor, i.e., the ratio of the output coupled light energy to the input coupled light energy of about 0.2.

Another embodiment of the switch cell or element comprises an optical switch element 17 of the described type, as shown in FIG. 3. In contrast to the first embodiment, this cell does not contain any elements for evaluating the rotation of the polarization plane of the beam, for example, it does not contain either a polarizer or an analyzer. This cell is based on the fact that another effect of the PLZT ceramic, namely what is referred to as a "scatter effect" is used. What is understood by this is the property of the ceramic to convert a parallel beam into a divergent beam having an overall aperture angle of about 6° upon passage through this ceramic when a voltage such as 18 is applied to the transparent electrodes of the ceramic, as illustrated in FIG. 3. The contrast values obtainable in practice lies between 10 and 15 and can be favorably influenced by a tubular aperture diaphragm 24, given a high packing density of the individual switch elements. What is particularly advantageous in this solution is that the high transmission factor of about 0.6 can be achieved with this structure. This makes this embodiment seem especially interesting, particularly for those utilizations which have a high radiant density.

The embodiment of the switch cell shown in FIG. 4 is also based on the exploitation of the scatter effect of the PLZT ceramic. This embodiment makes it possible to concentrate a high energy quantity onto a matrix dot 26 without having to thereby increase the radiant density at the active optical switch element 17. Given a constant surface load, a high energy quantity can only be sent through the optical switch element 17 when the passage area of the beam is enlarged. This is achieved when the radiation proceeding from the radiation source, not shown in FIG. 4, is converted into a parallel beam having a relatively large cross section.

In the embodiment shown in FIG. 4, the incident beam 27 is enlarged by a multiple in the vertical direction in comparison to the horizontal direction. As a result, such an enlarged beam has a rectangular cross section and can be achieved in technical optics by a slotted mask while considering the geometric conditions for the propagation of the beam. A first such slotted mask 28 is indicated in the embodiment of FIG. 4 and is arranged preceding or, respectively, on the surface of the optical switch element 17, which faces the incident direction of the beam.

A cylindrical lens 25, which focuses the vertically spread light beam onto the matrix dot 26, is arranged in the beam path between the optical switch element 17 and the matrix dot 26. The cylindrical lens 25 also has an additional slotted mask 29 allocated to it at its entrance side of radiation. The passage area of this second slotted mask is theoretically identical to the corresponding passage area of the first slotted mask 28. In practice, however, it will be dimensioned somewhat larger for tolerancing reasons.

The passage area of the second slotted mask 29 is indicated at A0 in FIG. 4 and will simultaneously identify the cross sectional area of the non-scattered beam 27 when it impinges the front face of the cylindrical lens 25. This condition occurs as long as the optical switch element 17 is not subject to any voltage. When, by contrast, the voltage 18 is applied to the transparent electrodes of the optical switch element 17, then the beam 27 is scattered so that the scattered beam comprises a cross sectional area A1 at the cylindrical lens. The radiant intensity, accordingly, changes in relation to the two areas A1 or, respectively, A0. Upon exploitation of the scatter effect of the optical switch element 17, thus, the energy which has passed through the cross sectional area of the second slotted mask 29 is significantly lower in the modulated condition of the switch element than in the inactive condition of the switch element. This energy focused in the matrix dot 26 is inadequate for locally melting the ink layer adhering to the carrier 1 at the matrix dot. When, by contrast, the beam 27 passes through the optical switch element unimpeded and unscattered, then the energy passing through increases in the ratio of the two area A1:A0. An energy quantity is, thus, concentrated at the matrix dot 26, which will cause the ink layer adhering to the carrier 1 to locally melt so that a transfer onto the print medium 9 will occur.

In this embodiment of the switch element most recently described with reference to FIG. 4, the power per unit area of the incident parallel beam 27 can be relatively slight since, due to the focusing of the energy vertically distributed at the optical switch element 17 by means of the cylindrical lens 25 onto the dot 26, an adequate quantity of energy impinges at this point. It should, therefore, not be overlooked that the slotted diaphragm 29 is not absolutely necessary for the function of the switch cell, as derives without further ado from the rules of geometrical optics. The slotted diaphragm 29 particularly serves the purpose of enhancing contrast, since it blanks stray light out which would otherwise fall on matrix dots allocated to neighboring, and additional switching cells.

A comparison of the above detailed description of the individual embodiments of switch cells makes it clear that these different possibilities enable use-associated designs which, on a case-by-case basis optimize a selected solution with respect to the desired characteristics of the thermo transfer printing unit. For example, a selection base on the printer performance and/or the size of the matrix dot.

Figure 5:
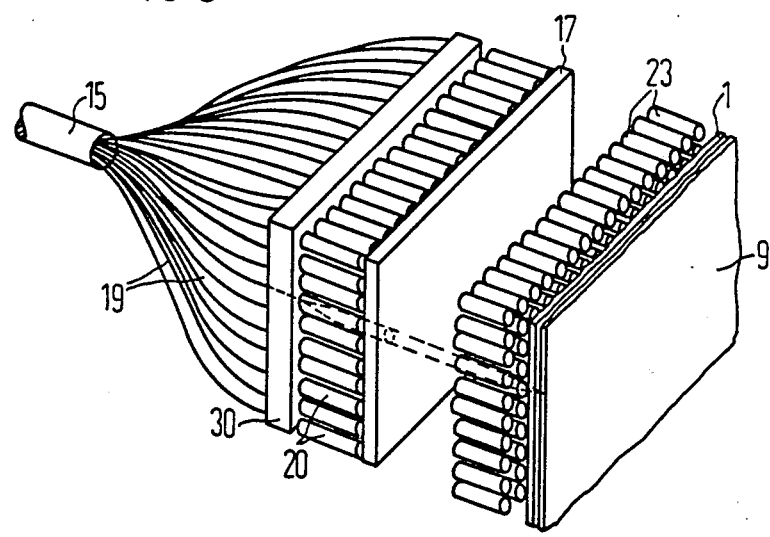
FIG. 5 is a perspective view of a two-dimensional field of switch cells for character generators in accordance with the present invention.

FIG. 5 schematically shows a module of a character generator which comprises a plurality of switch cells in a two-dimensional distribution. In this exemplary illustration, switch cells of the embodiment set forth with reference to FIG. 3 are utilized. A bundle of light fibers 15, comprising individual glass fibers 19, is indicated and these fibers go to a positioning plate 30 for the glass fibers. As in FIG. 3, the first gradient lenses 20 of the individual switch cells may again be seen and these act as collimator lenses. Arranged following the lenses 20 is a PLZT ceramic substrate which unites the local, optical switch elements 17 in a fine structure in a conventional manner. A field of second gradient lenses 23 allocated to the field of the first gradient lenses 20 are coaxially arranged in the output side and second gradient fibers 23, respectively, focus the rays of individual switch cells onto matrix dots in which the locally melted ink layer is transferred from the band-shaped carrier 1 onto the print medium 9. When it is assumed that the thermal transfer printer working with such a character generator is designed for line-by-line printing, then a plurality of such character generator modules could be arranged side-by-side in aligned direction in the way shown in FIG. 5.

Of course an appropriate electronic control unit is needed for such a character generator and this allows the plurality of optical switch elements 17 to be selected in parallel, i.e., simultaneously, and to be kept inactive or, respectively, to be activated indivdually, dependent on the supplied print information. Such a control means would be constructed in a way completely similar to comparable control devices as required, for example, for known, non-mechanical printers for print control. Such a control unit, which is conventional is not the improvement of the present invention and, thus is not described in greater detail.

The above description refers to a monochromatic thermo transfer printer, for it has been assumed that the band-shaped carrier 1 is coated with a single color ink layer on its surface facing the print medium 9.

Figure 6:
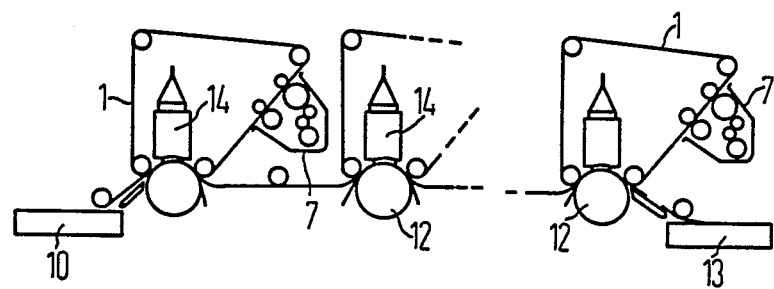
FIG. 6 is a schematic presentation similar to FIG. 1 of a radiation thermo transfer printers arranged in series for printing different monochromatic color one after another.

It is schematically indicated in FIG. 6 that a plurality of print units set forth in greater detail with reference to FIG. 1 can be connected in series following one another with reference to the print medium 9. Each of these print units posesses a different one of a plurality of fundamental or primary colors of a printed color. Since a monochromatic print unit based on the explained principle of the thermo transfer printer can also be constructed in a relatively compact fashion, even given high printing performances, a series connection of a plurality of printer units for polychromatic printing is definitely possible without such a design principle therefore leading to a disproportionately bulky printing device. It can, therefore, be decided on a case-by-case basis whether a three-color or four-color printing principle should be used for a polychromatic printer. As mentioned, each of the units would be the same, except for the particular color of the ink being utilized.

Although various minor modifications may be suggested by those versed in the art, it should be understood that we wish to embody within the scope of the patent granted hereon all such modifications as reasonably and properly come within the scope of our contribution to the art.

We claim:

1. In a thermo transfer printer having a printing head having a plurality of switch cells arranged in a two-dimensional field and controlled by the printing information, means for directing energy from energy sources via the switch elements onto respective matrix dots arranged in a grid which lie in a plane of an ink layer of a band-shaped carrier to locally melt due to energy absorption specific portions of the ink layer for transfer to a print medium pressed thereagainst, the improvements comprising the carrier being coated with a thermo plastic ink and being constructed as a circulating endless band, a heated inking means for regenerating a layer of ink on the band, the printing head in combination with a high energy radiation source being constructed as an optical character generator in which every switch cell comprises an optical switch element composed of a transparent ferro-electric ceramic substrate composed of lead zirconate titanate doped with lanthanum and has transparent surface electrodes for applying a pulse-shaped control voltage, each cell including a first optical element and a second optical element, said first optical element being positioned in the beam path preceding the optical switch element to couple a part of the energy output by a radiation source into the switch element as a parallel, expanded beam and the second optical element being arranged in the beam path following the optical switch element and at a predetermined distance from the carrier so that the second element focuses a received part of the beam into the allocated matrix dot.

2. In a thermo transfer printer according to claim 1, wherein the first optical element is a gradient fiber acting as a collimator lens to expand the beam received from the radiation source and emitted as a parallel beam and the second optical element is a second gradient fiber being arranged in the beam path following the optical switch element and being dimensioned in the length so that the focus of the second element lies in the allocated matrix dot on a coated side of the carrier.

3. In a thermo transfer printer according to claim 2, wherein each switch element includes a polarizer arranged in the beam path preceding the optical switch element, said polarizer emitting a parallel beam having a predefined polarization plane, an analyzer being arranged in the beam path following the optical switch element, the polarizing plane of said analyzer being rotated by an angle relative to that of the polarizer, said angle coinciding with the rotation angle of the polarization upon passage of the beam through the optical switch element when the element is activated by a pulse-shaped voltage having a predescribed amplitude.

4. In a thermo transfer printer according to claim 2, wherein each element operates on the basis of a scatter effect of the radiation by the energized optical switch element, said second gradient fiber being spaced at a distance from the switch element in comparison to the corresponding distance of the first gradient fiber.

5. In a thermo transfer printer according to claim 4, wherein the second gradient fiber has a tube-shaped aperture diaphragm for blanking out undesired stray radiation allocated thereto.

6. In a thermo transfer printer according to claim 2, wherein each of the switch elements has a glass fiber for conducting light from the energy source to the input side of the first gradient fiber, said optical fiber having a diameter smaller than the diameter of the first gradient fiber.

7. In a thermo transfer printer according to claim 6, wherein the diameter of the glass fiber is smaller by at least one order of magnitude in comparison to the diameter of the first gradient fiber.

8. In a thermo transfer printer according to claim 1, wherein each switch element operates in an optical scattering effect of the radiation by the energized optical switch element, said first optical element being fashioned as a slotted diaphragm which couples a parallel beam having a rectangular cross section into said switch element and said second optical element being fashioned as a cylindrical lens.

9. In a thermo transfer printer according to claim 8, which includes a second slotted diaphragm being provided adjacent a radiation entrance face of the cylindrical lens, said second slotted diaphragm being aligned in the beam path positionally true relative to the first slotted diaphragm and blanking out stray components of the radiation output produced by said energized switch element.

10. In a thermo transfer printer according to claim 1, wherein the means for transferring energy from the source to the optical character generator comprises a glass fiber bundle with an individual glass fiber being allocated to each of the switch cells, the end faces of each of the glass fibers facing toward the switch cells being fixed to a transparent position plate opposite said two-dimension field of switch cells and being coaxially aligned relative to the beam path of the individual beams for each cell.

11. In a thermo transfer printer according to claim 10, said printer being a line-by-line printer and having a plurality of character generator modules, each module having a two-dimensional field of switch cells with a character generator, said character generator modules being arranged side-by-side in the direction of the printing line.

12. In a thermo transfer printer according to claim 1, which includes a pressure roller being provided between two circulating rollers for the continuous band-shaped carrier belt, and in the region of the dot matrix plane generated by the character generator, the print medium running over said pressure roller and said pressure roller pressing said print medium against the ink side of said carrier belt.

13. In a thermo transfer printer according to claim 12, wherein, as seen in the rotational direction of the carrier, said inking means being arranged following said pressure roller and comprising a heating means which causes any remaining ink layer or dye on the carrier to melt when entering the inking means, said inking means continuously and completely regenerating the carrier with a layer of ink and the path of the carrier providing a cooling portion between the inking means and the character generator so that the regenerated ink layer on the carrier has time to solidify prior to engaging the print medium which is pressed thereagainst by the pressure roller.

14. In a thermo transfer printer according to claim 13, wherein polychromatic printing is obtained by arranging a plurality of printing units, each containing a character generator, a circulating path for a continuous carrier and an inking means, said units being arranged in series with respect to the conveying path for the print medium, which extends from an input station to an output station, each unit using a different color selected from fundamental colors used for the polychromatic printing.

* * * * *